US008488915B2

(12) United States Patent
Jayant et al.

(10) Patent No.: US 8,488,915 B2
(45) Date of Patent: Jul. 16, 2013

(54) AUTOMATIC VIDEO QUALITY MEASUREMENT SYSTEM AND METHOD BASED ON SPATIAL-TEMPORAL COHERENCE METRICS

(75) Inventors: Nuggehally Sampath Jayant, Alpharetta, GA (US); Nitin Suresh, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 991 days.

(21) Appl. No.: 12/226,978

(22) PCT Filed: May 1, 2007

(86) PCT No.: PCT/US2007/010518
§ 371 (c)(1),
(2), (4) Date: Nov. 3, 2008

(87) PCT Pub. No.: WO2007/130389
PCT Pub. Date: Nov. 15, 2007

(65) Prior Publication Data
US 2009/0208140 A1   Aug. 20, 2009

Related U.S. Application Data

(60) Provisional application No. 60/796,509, filed on May 1, 2006.

(51) Int. Cl.
*G06K 9/03*   (2006.01)
*G06K 9/40*   (2006.01)
*H04N 7/12*   (2006.01)

(52) U.S. Cl.
USPC ................. 382/309; 382/254; 375/240.01

(58) Field of Classification Search
USPC ............................................. 382/309
See application file for complete search history.

(56) References Cited

U.S. PATENT DOCUMENTS

| 5,717,464 A    | 2/1998  | Perkins et al. |
| 5,734,843 A    | 3/1998  | Gephardt et al. |
| 5,799,111 A *  | 8/1998  | Guissin ...................... 382/254 |
| 5,929,918 A    | 7/1999  | Pereira et al. |
| 6,195,394 B1 * | 2/2001  | Arbeiter et al. .......... 375/240.29 |
| 6,437,821 B1 * | 8/2002  | Janko et al. .................. 348/180 |
| 2002/0031277 A1| 3/2002  | Lubin et al. |
| 2003/0051843 A1*| 3/2003 | Keller et al. ................. 162/198 |
| 2003/0138163 A1*| 7/2003 | Chen et al. ................... 382/274 |

(Continued)

OTHER PUBLICATIONS

Süsstrunk et al., Color image quality on the Internet, in Proc. SPIE Internet Imaging, vol. 5304, Jan. 2004, pp. 1-14.*

(Continued)

*Primary Examiner* — David Zarka
(74) *Attorney, Agent, or Firm* — King & Spalding

(57) ABSTRACT

An automatic video quality (AVQ) metric system for evaluating the quality of processed video and deriving an estimate of a subjectively determined function called Mean Time Between Failures (MTBF). The AVQ system has a blockiness metric, a streakiness metric, and a blurriness metric. The blockiness metric can be used to measure compression artifacts in processed video. The streakiness metric can be used to measure network artifacts in the processed video. The blurriness metric can measure the degradation (i.e., blurriness) of the images in the processed video to detect compression artifacts.

35 Claims, 9 Drawing Sheets

U.S. PATENT DOCUMENTS

| | | | |
|---|---|---|---|
| 2004/0012675 A1 | 1/2004 | Caviedes | |
| 2004/0013315 A1* | 1/2004 | Li et al. | 382/268 |
| 2004/0054758 A1 | 3/2004 | Chang et al. | |
| 2004/0156559 A1* | 8/2004 | Cheng et al. | 382/286 |
| 2006/0029067 A1 | 2/2006 | Conway | |
| 2006/0072673 A1* | 4/2006 | Holcomb et al. | 375/240.25 |
| 2006/0268980 A1* | 11/2006 | Le Dinh et al. | 375/240.01 |
| 2007/0053575 A1* | 3/2007 | Prakash et al. | 382/137 |

OTHER PUBLICATIONS

Gao et al., A De-Blocking Algorithm and a Blockiness Metric for Highly Compressed Images, IEEE Transactions on Circuits and Systems for Video Technology, vol. 12, Dec. 2002, pp. 1150-1159.*

International Search Report, PCT/US2007/010518, Dec. 11, 2007, United States Patent and Trademark Office.

* cited by examiner

AUTOMATIC VIDEO QUALITY MEASUREMENT SYSTEM AND METHOD BASED ON SPATIAL-TEMPORAL COHERENCE METRICS

RELATED PRIORITY APPLICATIONS

This application is a National Stage patent application filed under 35 U.S.C. §371 of International Patent Application No. PCT/US2007/010518, filed May 1, 2007, which designated the United States of America, and which claims priority to U.S. Provisional Patent Application No. 60/796,509, filed May 1, 2006. The disclosure of each of the above-identified related applications is hereby fully incorporated herein by reference.

FIELD OF THE INVENTION

The present invention relates to measuring network and compression artifacts in video data broadcast over a network. More particularly described, the present invention relates to an enhanced system and method for detecting, measuring, and correlating network and compression artifacts with subjective measurements, where the measurements can be taken anywhere in a network and without the presence of the original video data feed.

BACKGROUND OF THE INVENTION

As multimedia services become more pervasive, video communications will play an increasing role in entertainment as well as in important new classes of applications such as tele-collaboration, tele-health and distributed education. Consumer applications will continue to be entertainment-intensive, with the new foci of EoD (everything-on-demand) and mobility.

Video quality evaluation is an important problem in audio-visual communications. The need for perceptually meaningful objective metrics is broadly recognized, and such measures have the dual role of (a) understanding signal quality in completed algorithm designs and (b) providing an in-the-loop metric for real-time algorithm steering. For video, subjective testing is the ideal approach, since it involves real viewers evaluating the end output. In current subjective testing methodology, the discrete-point of Mean Opinion Score (MOS) and Mean Impairment Score (MIS) are well understood and provide useful quality measurements under conditions in where there is adequate training of subjects, and if the mean scores are appropriately qualified by a standard deviation score reflecting interviewer differences. Some established methods of subjective testing involve viewers watching different video clips and giving each clip a score, or giving a continuous score using a user feedback device like a slider or throttle. Some of the desired characteristics of a testing scheme involve ease, intuitiveness, effectiveness, and giving the user real-time feedback about the current score. Mean Time Between Failures (MTBF) is an intuitive video quality metric that is used in this work.

Subjective testing takes up a significant amount of time and effort, and hence objective testing for video is a more practical approach. Objective metrics can be broadly classified based on the amount of information available about the original video. Full-reference metrics need the complete original signal for metric calculation. Reduced-reference metrics need some information extracted from the original video to be transmitted over the channel for comparison with the received video. No-reference metrics work on the received video alone. No-reference and reduced-reference metrics are considered to be more practical than full-reference metrics because the original video is in general not available at an arbitrary place of quality evaluation such as a network node or the ultimate receiver.

Block-Transform based compression schemes like MPEG-2 and H.264 introduce a variety of artifacts in the video. Blockiness and blurriness are two of the most common artifacts. Block artifacts occur when the DCT-block edges are visible in the picture frames, and blurriness is caused at times when the edges in the image are subject to excessive compression. Apart from these compression related artifacts, packet losses in the video stream cause network artifacts as well, which manifest themselves as unnatural streaks in the frames or as stuck/reordered frames. There are a considerable number of blockiness metrics in literature, and exhaustive surveys of those metrics as well. Most metrics compare the inter-block and intra-block differences to get an estimate of the video quality. Some metrics compare the differences in correlation between and across block boundaries. Some metrics measure blockiness from the histogram of edge angles in the video frames. These blockiness metrics in general focus on a video frame, and do not incorporate temporal masking. The metrics described above are no-reference in nature, meaning that the quality score can be evaluated with just the received video. There are some reduced-reference metrics as well, that evaluate blockiness. For instance, one such metric evaluates video quality by measuring the degradation of certain features extracted over the frames. One of the features relates to the addition of new edges in the compressed video that are close to horizontal or vertical alignments.

Some of the drawbacks of current metrics are that they can function unexpectedly when the image contains intended edges (i.e., blurry edges that are naturally present). This problem is avoided at times by using different thresholds for omitting natural edges. The threshold calculation is difficult, however, resulting in a few false decisions. When the metrics are calculated over an original signal with no block artifacts, one would expect a metric signature that indicates an error free signal. In general, this is not the case, and there is in fact a varying signature with time. This problem is particularly encountered when there are scene changes in the video.

In addition to blockiness, research has also evaluated the effect of packet losses on video. The algorithms used in detecting network errors can be bit-stream based, pixel-based, or a combination of the two. One such algorithm estimates the mean squared error by just looking at the received bit-stream. A classifier algorithm is used to measure the visibility of a packet loss based on certain stream parameters. The temporal locations of the packet losses, the amount of motion and the accuracy and consistency of motion prediction are some of the parameters considered. Some network-error detectors use blockiness metrics in a modified fashion. The blockiness is measured as a function of time, and any abrupt changes in this signature are used to indicate a network error. This simple pixel based measure could possibly face problems with video that is varying considerably or has many scene changes.

Blurriness has also been evaluated in prior research. To measure blurriness, conventional blurriness metrics typically focus on measuring the blurriness either directly or indirectly through a measure of sharpness. One such metric, for example, locates the edges in a given frame and evaluates blurriness as a measure of the average edge spread. In another such metric, a measure of image sharpness is obtained by calculating the local edge kurtosis around edges. Some metrics compute the blurriness as a function of the histogram of DCT coefficients in the compressed bit-stream. Some of the disadvantages of the conventional blurriness metrics, as described above, are that they typically require accurate edge detection, and further, blurry edges that are intended to be in the video are oftentimes incorrectly denoted as visually bad. Further, conventional techniques do not incorporate temporal effects of blurriness.

Based on the above, there presently exists a need in the art for an enhanced no-reference objective video quality metric that can evaluate these different artifacts with a unified approach and also correlates well with subjective video evaluations.

SUMMARY OF INVENTION

The inventive automatic video quality metric system can be used to evaluate the quality of processed video in a reliable manner and without the need for significant resources in terms of processing power and overhead of bandwidth. The AVQ system also correlates well with subjective measurements. The AVQ system can comprise a blockiness metric, a streakiness metric, and a blurriness metric. The blockiness metric can be used to measure compression artifacts in processed video. The streakiness metric can be used to measure network artifacts in processed video. The blurriness metric can measure the degradation (i.e., blurriness) of the images in processed video to detect compression artifacts.

The AVQ system may also determine a Mean Time Between Failure (MTBF) for the processed video by correlating the objective metrics with subjective test results. The AVQ system may display the MTBF on an AVQ meter. The AVQ meter may also display a measure of the network and compression artifacts measured by the AVQ system.

BRIEF DESCRIPTION OF THE DRAWINGS

The advantages and aspects of the present invention will be more fully understood in conjunction with the detailed description which follows, and the accompanying figures, wherein.

DETAILED DESCRIPTION

Figure 1:
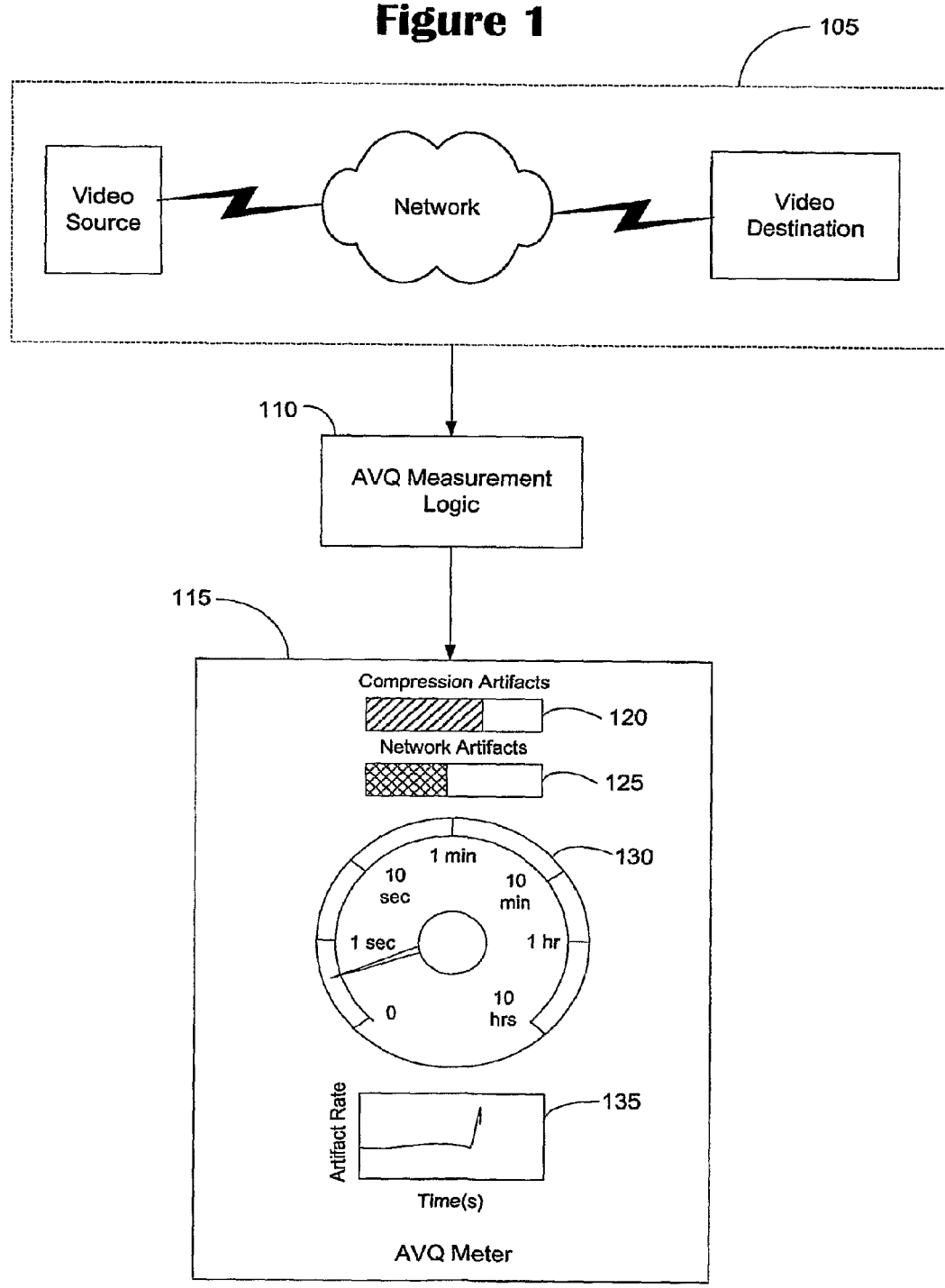
FIG. 1 illustrates a representative operating environment for the automatic video quality (AVQ) metric system, according to an exemplary embodiment.

The inventive automatic video quality metric system can be used to evaluate the quality of processed video in a reliable manner and without the need for significant resources in terms of processing power and overhead of bandwidth, and correlates well with subjective measurements. FIG. 1 illustrates a representative operating environment for the automatic video quality (AVQ) metric system 110 (AVQ system). Advantageously, the system 110 allows for evaluation of processed video anywhere in a network 105, and can measure video in the case where the original video reference is not available. After measuring the video, the AVQ system 110 can, in an exemplary embodiment, show the measured coding and network errors on an AVQ meter 115. The AVQ system 110 and AVQ meter 115 may be implemented and executed in software code, as can be performed by one of ordinary skill in the art in view of the methods and systems described herein.

In an exemplary embodiment, the AVQ system 110 works by comparing the received video signal (henceforth denoted by '$Y_n$') with a reference signal ('S'). The reference signal can either be the original video frame(s) ('$X_n$', '$X_{n-1}$', ... etc.), some information extracted from the original video ('$XS_n$') or the video frames received and decoded at the output before the current frame ('$Y_{n-1}$', '$Y_{n-2}$', '$Y_{n-3}$', ... etc.). In particular, an exemplary method for implementing the AVQ system 110 computes a zero-reference metric using multiple output video frames to create a reference video as a basis for the advanced computing and analysis of spatial-temporal coherence. Using multiple output frames, as in this exemplary embodiment, creates a replica of the original for reliable spatial-temporal analyses. One of the methods of comparing $Y_n$ and the reference signal, S, includes comparing smaller sections of both. All portions of the two can be compared, or only selective regions deemed as visually important can be considered.

The AVQ system 110 may compare $Y_n$ and S by using a simple mean squared difference between the portions in comparison. The comparison could also include computing the autocorrelation plots of the smaller sections and comparing the autocorrelation functions of corresponding sections. This specific nature of comparison, which is described herein as the "delta-autocorrelation" method, involves computing the mean difference of the autocorrelation plots of corresponding sections of the current signal and the reference signal. Alternately, the Absolute Mean Difference Function (AMDF) can also be used, instead of the autocorrelation function.

Let 'R' denote the function used in the comparing algorithm. In one embodiment, R would be the mean value of the difference in autocorrelation plots of the sections in comparison. This would make 'R' the delta-autocorrelation method described earlier. In general, the autocorrelation (and cross-correlation) functions can be replaced by other spatial-temporal functions that characterize signal coherency or dependency. In addition, the function 'R' could be modified and adapted to different kinds of artifacts. For instance, 'R' could be the measure of the skewed spatial distribution of exactly vertical long edges in the difference image between the current frame and the reference frame. This would result in the detection of blocking artifacts. Alternatively, 'R' could be the measure of the additional skewed spatial distribution of exactly horizontal long edges in the difference image between the current frame and the reference frame. This would result in the detection of network streakiness errors. The reference frame mentioned in the examples of blockiness and streakiness algorithms above could be, as an example, the previous decoded frame. Alternatively, the reference frame could be a processed version of the current frame itself. For instance, the reference frame could be a spatially smoothened or blurred version of the current frame itself. The comparison function 'R' could be a simple difference measure or the more sophisticated delta-autocorrelation method mentioned earlier, and this would help in the detection of blurriness in images.

The reference frame could also be a function of the current frame and the neighboring frames. For instance, the reference frame could be a temporally smoothened version of the current frame (average of the previous frame, current frame and the next frame). The comparison function 'R' could be a simple difference measure or the more sophisticated delta-autocorrelation method mentioned earlier, and this would help in the detection of temporal blurriness in video, rather than just the spatial blurriness per frame. This could be used to measure the temporal deviation from the current measured video quality during a detected scene change or other kind of specific video events.

In an exemplary embodiment, the video evaluation algorithm uses at least one feature based on the current and neighboring frame statistics, such as, but not limited to: $R(X_n, Y_n)$; $R(Y_{n-1}, Y_n)$; $f(R(Y_{n-1}, Y_n), R(Y_{n-2}, Y_{n-1}))$, where one example of $f$ can be a simple absolute difference function; $f(R(Y_{n-1}, Y_n), R(X_{n-1}, X_n))$; $R(Y'_{n-1}, Y_n)$; $f(R(Y'_{n-1}, Y_n), R(Y'_{n-2}, Y'_{n-1}))$, where Y' implies that instead of just using the previously decoded frames as reference, the motion compensation vectors are used to refine the usefulness of the reference signals; and global statistics using combinations of arithmetic mean (AM), geometric mean (GM), and harmonic mean (HM) of different spatial-temporal functions could be used as well (operations on local statistics capturing macroblock or frame properties).

One of the useful products of this approach results in a zero-reference system for monitoring video quality where no reference needs to be made to the original undistorted video information. One of the ways to replicate original video properties is to combine the information from a multiple-frame window of the artifacted original, possibly in a complex non-linear fashion, with correlation to subjective quality being a function of the complexity.

In accordance with an exemplary embodiment of the invention, the AVQ system 110 can measure and evaluate processed video by using a combination of spatial-temporal coherence metrics. Utilizing various spatial-temporal coherence metrics, video artifacts can be evaluated by observing the behavior of specific attributes of the video within a frame and across frames. Comparing the evaluated video artifacts, the AVQ system 110 can produce an objective measurement that correlates well with subjective evaluations to determine a quantity called Mean Time Between Failure (MTBF), where failure refers to video artifacts deemed to be perceptually noticeable.

Figure 2:
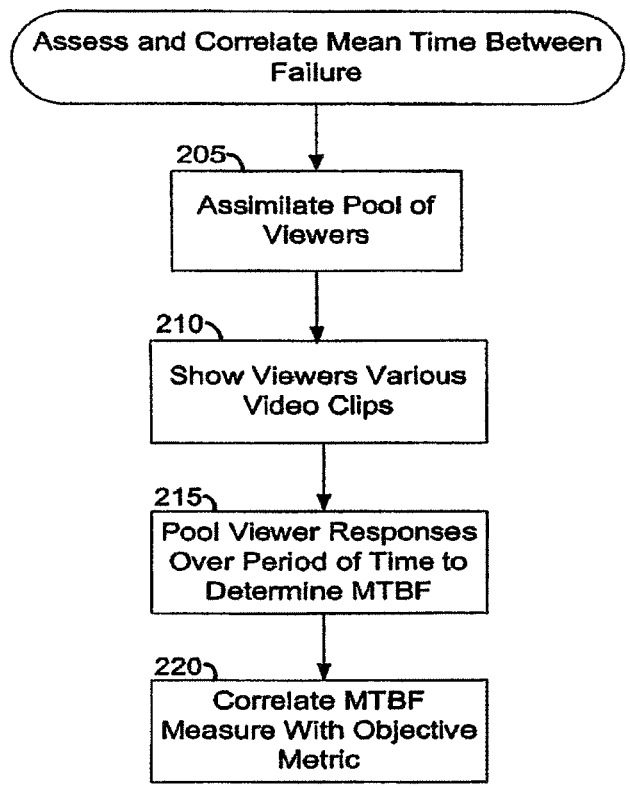
FIG. 2 illustrates a method for correlating a Mean Time Between Failure (MTBF) with an objective metric, according to an exemplary embodiment.

FIG. 2 illustrates an exemplary method for evaluating MTBF. MTBF is a common term in the measurement of quality of service. Here, it is applied to subjective video quality evaluation as a global metric. Failure rate is a related instantaneous metric based on failure statistics, where failure corresponds to the occurrences of visual artifacts. Failure rate is useful in computing MTBF specifics, such as MTBF function of viewer or stimulus.

According to an exemplary embodiment for evaluating MTBF from an objective metric, at step 205, a subject pool of viewers is collected. According to a preferred embodiment, this subject pool consists of eight viewers. At step 210, the viewers are shown various video clips. In an exemplary embodiment, these video test clips are from the Video Quality Experts Group (VQEG), and represent a range of graphics and activities. According to this embodiment, the test clips are of duration of eight to ten seconds each, and each clip is available at different bit rates. Further, according to this exemplary embodiment, the test clips are shown to the viewers at bit rates in the range of 1.5 to 5 Mega-bits per second (Mbps).

At step 210, as the various VQEG video clips are shown to the viewers, the viewers indicate—using a buzzer or other signifying device—when they observe perceptual artifacts, including, but not limited to, noise, blurriness, and blockiness. So that the viewers understand what types of artifacts they are looking for, the artifacts can be shown and explained to the viewers prior to the testing. Continuing at step 210, if an entire stretch of video looks bad or corrupted to a viewer, the viewer is allowed to keep the buzzer or other device pressed the entire video sequence.

The idea behind the testing described at step 210 is that the viewer intuitively tends to give feedback intermittently, with a frequency correlating with how bad the video looks. Though the locations of the user responses are arbitrary for a particular viewer during a particular experiment, the results for a modest number of experiments with a sufficient number of viewers can be averaged to generate a continuous score versus time, which correlates to the probability that the average viewer would observe a visual artifact while watching the video.

At step 215, the user responses are pooled over a period of time to determine the MTBF of the video. Specifically, from the extensive test data, MTBF can be averaged over a set of test clips to obtain the spread of MTBF with different viewers as a function of bit rate. Alternatively, MTBF can be averaged over all the viewers/test clips and displayed as a function of bit rate, or it can be averaged over all the viewers for every test clip and bit rate setting. The overall average of MTBF calculated over all the parameters involved (different viewers, test clips, and bit rate) can also be calculated from the test data.

There are many advantages to this subjective metric. For instance, it is highly intuitive, time invariant, and the user need not have real-time feedback about the current score. The subjective metric is also functional, being directly related to how consumers evaluate otherwise high-quality video. Further, MTBF is not concerned with the physical categorization of an artifact, only that it is deemed visible. In this sense, it is non-diagnostic, but simple and universal.

At step 220, the subjective MTBF measure can be correlated with an objective metric to determine the effectiveness of the objective metric. While the AVQ metric system 110 is correlated to the subjective metric MTBF in the exemplary embodiments contained herein, it is understood by one of ordinary skill in the art that the AVQ system 110 can be correlated to any objective metric, including, but not limited to MOS, MIS, video quality metric (VQM), and generalized block edge impairment metric (BLK). Specifically, to correlate an objective metric, the relationship between an objective score (i.e., objective artifact measurement) and the corresponding value of MTBF (averaged over all viewers for different test clips at different bit rates) can be interpolated to find the expected MTBF of any video. MTBF characteristics seem to exhibit an exponential type of behavior. For example, as Peak-to-Signal Noise Ratio (PSNR) of a sequence increases, the MTBF exponentially increases up to a point after which visual artifacts are practically not visible. This can be observed from a scatter plot of log(MTBF) versus the objective metric. The knee of the exponential curve depends on the type of video sequence.

Accordingly, using the relationship between MTBF and the objective-metric, the MTBF of any arbitrary video can be calculated. First, the objective-metric versus time of the corrupted video is calculated. With this, the failure-rate is estimated using a table look-up, and then MTBF is calculated for the overall video sequence as the reciprocal of the average failure rate.

Thus, the measurements made by the AVQ system 110 can be correlated to the MTBF values from the subjective metric to find an expected MTBF for a given video feed. To do so, the scatter plot of the 'log(MTBF) versus the objective-metric' graph generated by the AVQ system 110 is observed. From this, the exponential best fit is determined to find the relationship between the objective-metric and MTBF. The relationship between the metric evaluated and the failure rate can be computed using the inverse relationship between MTBF and failure rate. In this way, the AVQ system 110 is essentially tuned to maximize the correlation with the MTBF numbers gathered from the subjective test, with this tuning using the same video database as the original subjective test.

Figure 3:
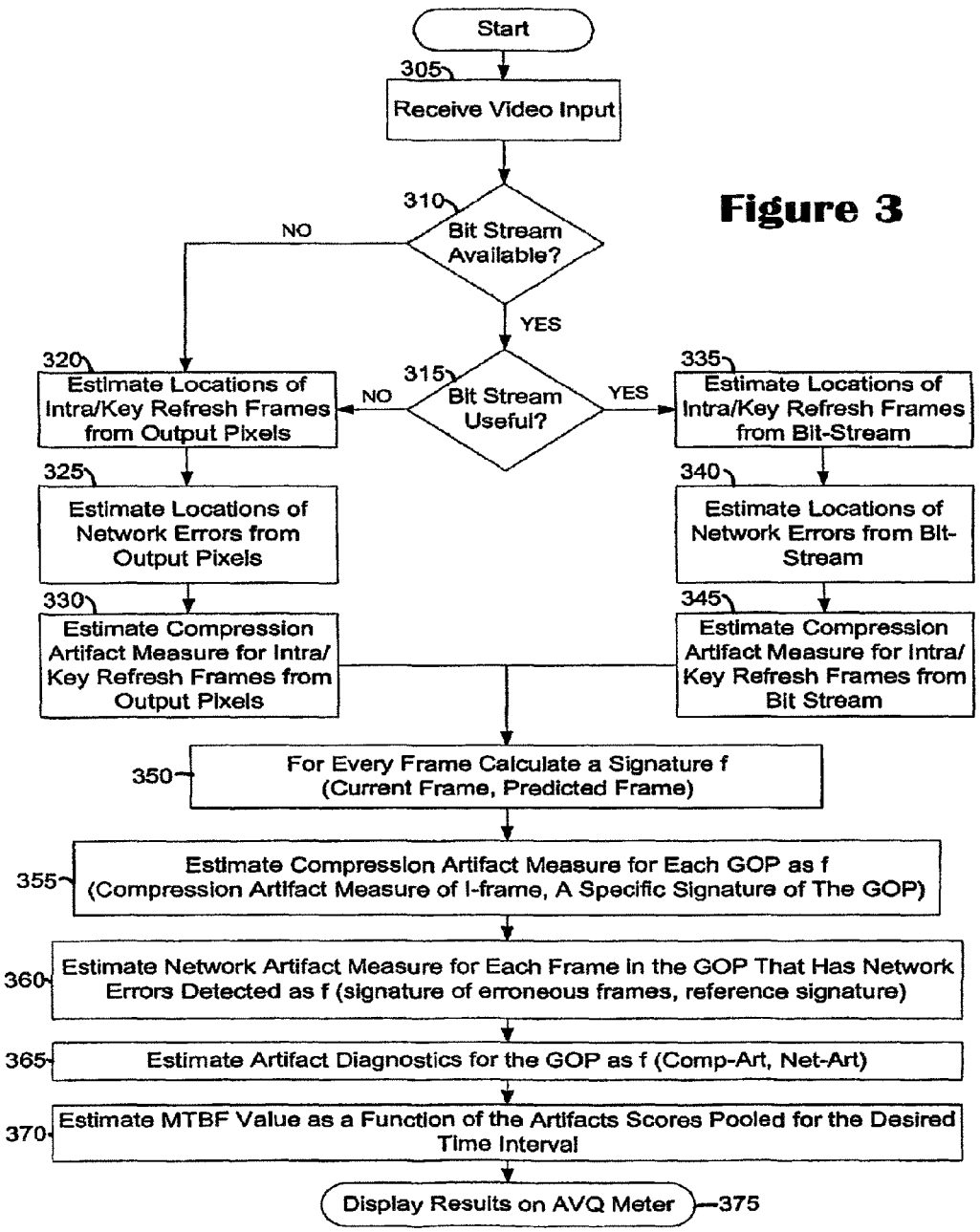
FIG. 3 illustrates a method for implementing the AVQ metric system, according to an exemplary embodiment.

FIG. 3 illustrates an exemplary method for implementing the inventive AVQ system 110, wherein blockiness, streakiness, blurriness and network-error detectors are utilized to evaluate and estimate a MTBF value for the processed video. At step 305, the video input is received by the AVQ system 110. Because the AVQ system 110 does not require the original video (i.e., it is a no reference metric), it has the advantage that it can be used anywhere in a network to measure and evaluate processed video for coding and network errors. Therefore, the video that is received by the AVQ system 110 at step 305 can be from anywhere in the network.

At step 310, the AVQ system 110 determines whether the bit-stream is available for measuring and evaluating. For example, in some implementations, the system may not have access to the bit-stream. In those scenarios, the output pixels will be used to evaluate the video. Therefore, if no bit stream is available, the system executes step 320 where it estimates the locations of intra/key refresh frames from output pixels.

Figure 4:
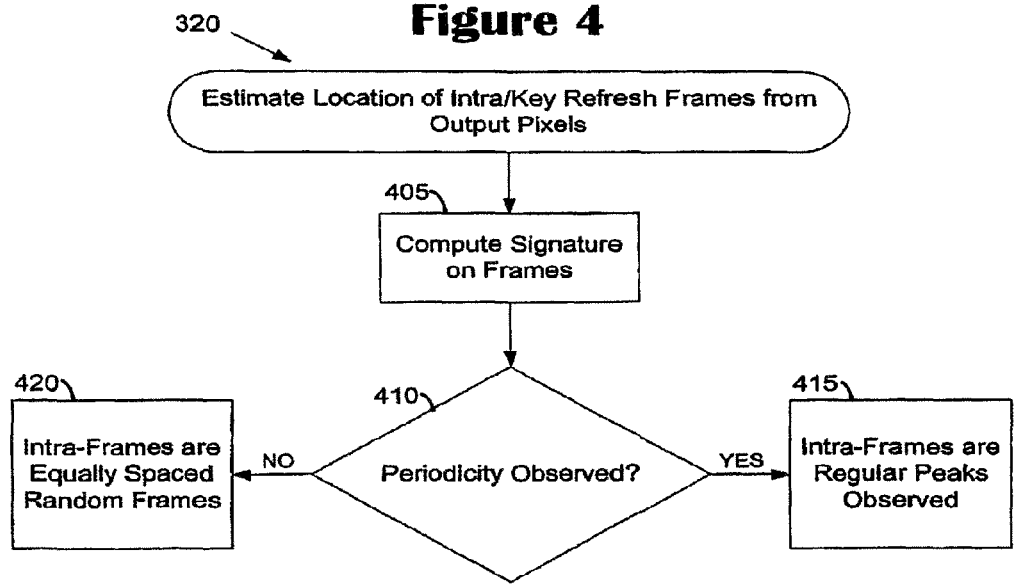
FIG. 4 illustrates a method for estimating the location of intra/key refresh frames from the output pixels of processed video, according to an exemplary embodiment.

FIG. 4 illustrates an exemplary method for estimating the intra/key refresh frames from output pixels, according to step 310. At step 405, a signature is computed on the frames (e.g., calculate the mean local variance with time as the signature). Next, at step 410, periodicity is observed to detect the intra frames. If periodicity is observed at step 410, then the intra-frames are chosen as the regular peaks observed at step 415. However, if no periodicity is observed, the intra-frames are chosen as equally spaced frames at random at step 420.

Returning to FIG. 3, once intra/key refresh frames are estimated, the AVQ system 110, at step 325, estimates locations of network errors from output pixels when no bit stream information is available. This can be done by computing a signature on the frames, and this signature can be used to detect if network errors have occurred. An example of such a process would be to process a difference function of adjacent frames with an edge filter, and detect edges that are exactly horizontal/vertical and longer than a specific length. The signature of these frames is a measure of the skewed distribution of such edge pixels, and sudden peaks in this signature indicate the location of network errors.

Figure 5:
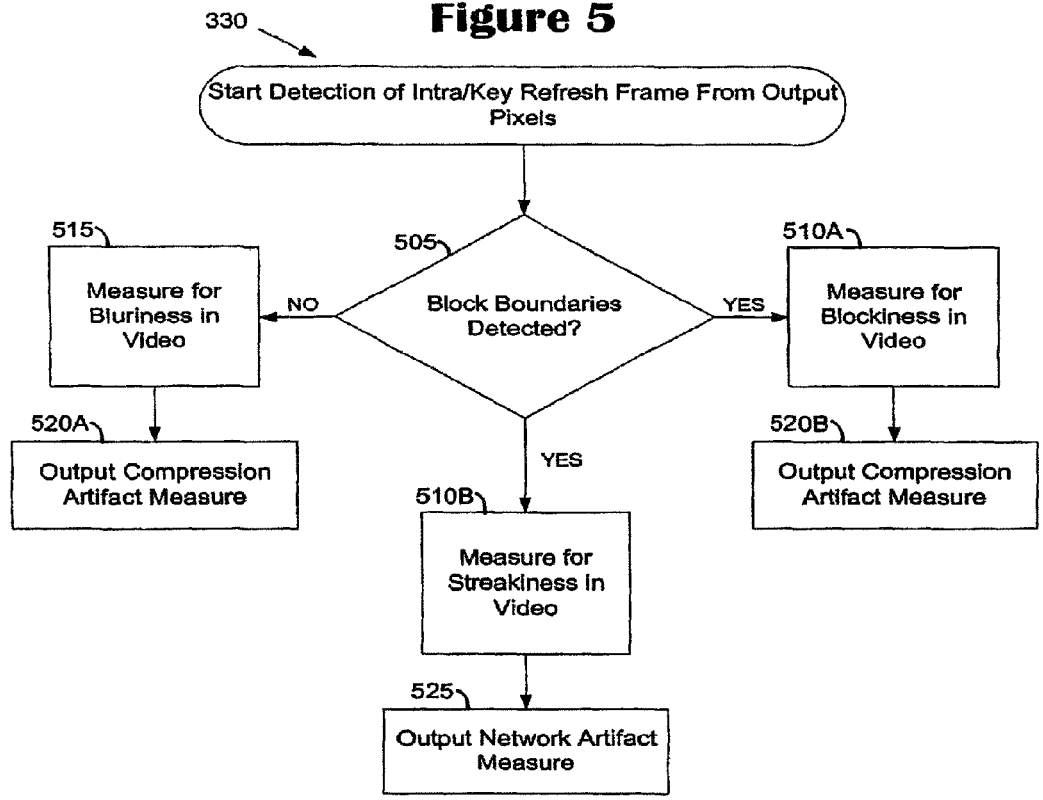
FIG. 5 illustrates a method for detecting and measuring the level of artifacts in the output pixels of processed video, according to an exemplary embodiment.

Once the network errors are detected from the output pixels, the AVQ system 110 estimates compression artifacts from output pixels at step 330. FIG. 5 illustrates an exemplary process for this step. At step 505, the system attempts to detect block boundaries by comparing the borders of each block and detecting difference in values. If block boundaries are detected, a measure for blockiness can be performed at step 510A to produce an compression artifact measure. Further, a measure of streakiness could be performed at step 510B and used to produce a network artifact measure. Additionally, if no block boundaries are detected at step 505, then a measure of blurriness can be performed at step 515. Based on which metric is evaluated, an output compression artifact measure is obtained to use with the AVQ system 110 at either step 520A or 520B. Similarly, the AVQ system 110 can output a network artifact measure at step 525.

Figure 7:
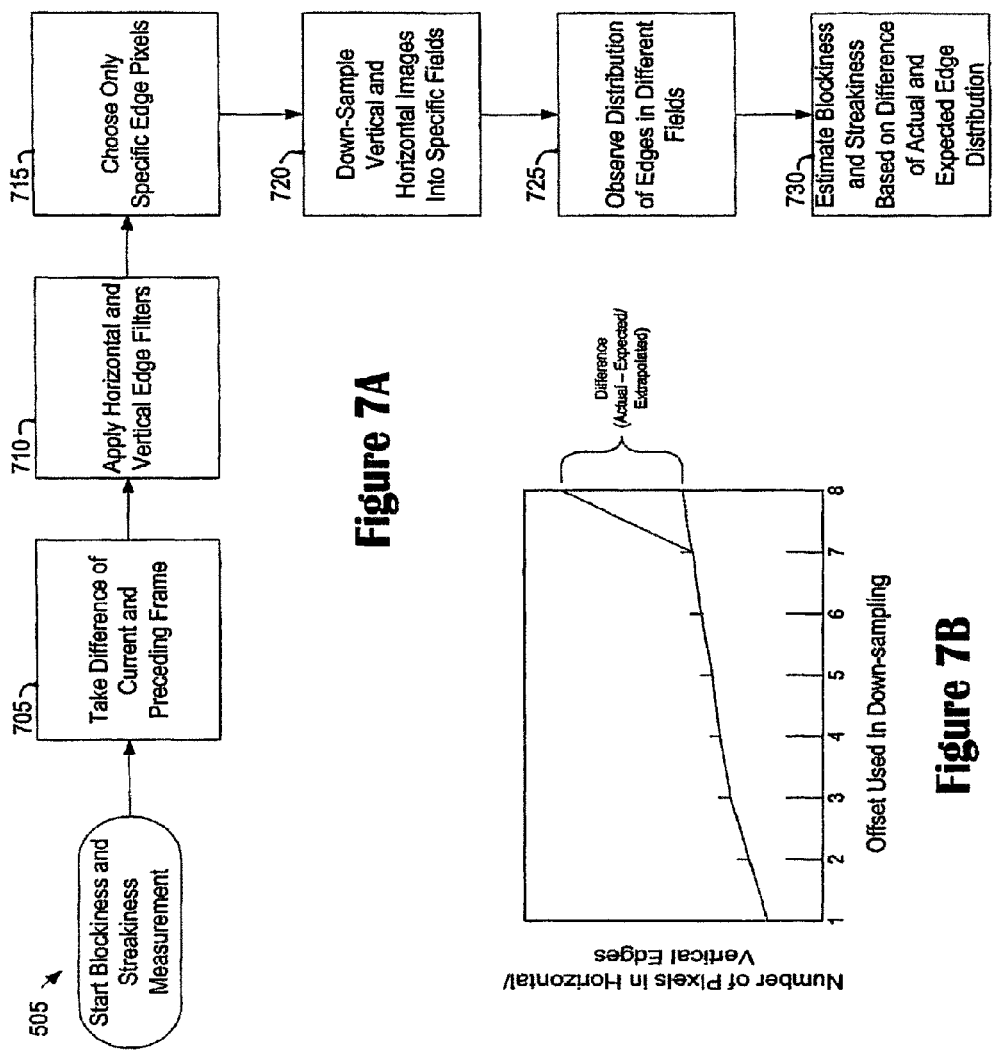
FIGS. 7A and 7B illustrate a method for measuring blockiness and streakiness in processed video, according to an exemplary embodiment.

FIGS. 7A and 7B illustrate an exemplary method for determining blockiness and streakiness. The proposed metric for detecting block artifacts works by evaluating the spatial and temporal distribution of edges, especially horizontal and vertical edges in the video. This exemplary method is shown to have a good correlation with subjective scores, and when combined with ideas from existing metrics, can outperform existing blockiness metrics. Aside from the good correlation, this metric is also observed to be computationally efficient.

Because the blockiness metric does not need access to the exact location of the individual block boundaries, it is possible to function as a pixel based algorithm without any need to access the bit-stream. The metric can be evaluated on per frame basis, or evaluated over different regions of a frame and pooled as required. Working on inter-frame differences, or in general, a function of different frames in a neighborhood is observed to produce good results. When performed on just the video frame, the algorithm has to use appropriate thresholds to make sure that intended edges in the image, such as frame borders, are not incorrectly detected as artifacts. When the blockiness metric uses inter-frame differences, this problem is avoided. If the intended edge is stationary, then it does not figure in the inter-frame difference. If the intended edge is moving, then it figures in different down-sampled fields in the frame difference image, and does not interfere with the blockiness calculation. The inter-frame difference makes it easier to observe the blockiness in video.

According to an exemplary embodiment of the blockiness and streakiness method, the difference of a current and preceding frame are taken at step 705 (i.e., inter-frame difference is taken). As discussed, this step has the effect of removing intended edges from consideration by the metric. At step 710, horizontal and vertical edge filters are applied to get the horizontal and vertical edges in the resulting image. The step involved in deciding whether a pixel belongs to a vertical/horizontal edge involves spatial-temporal masking. For instance, a spatial masking function known by one of ordinary skill in the art could be used to decide which pixels belong to a vertical/horizontal edge.

'W' indicates the weight of the spatial-masking algorithm, and 'mean' denotes the average luminance value around the pixel of interest. A higher weight in the function indicates that the effect of the pixel difference is more pronounced. The spatial masking function also takes into account the effect of local standard deviation, as expressed below. As it can be seen in this equation, artifacts are most visible when the mean pixel value is at 'zeta'. In an exemplary embodiment, zeta is set at a value of 81 to determine the presence of artifacts.

$$W = \begin{cases} \lambda \ln\left(1 + \frac{\sqrt{mean}}{1 + deviation}\right), & mean < \varsigma \\ \ln\left(1 + \frac{\sqrt{255 - mean}}{1 + deviation}\right), & mean \geq \varsigma \end{cases}$$

where, $$\lambda = \frac{\ln(1 + \sqrt{255 - \varsigma})}{\ln(1 + \sqrt{\varsigma})}$$

The edge detection process involves applying the masking function to the pixel differences and then comparing it to a certain threshold. The same goal is achieved by choosing the threshold as a function of average luminance and standard deviation values. This turns out to be computationally more efficient, given that this new masking function can be approximated as a combination of line segments. In addition, the standard deviation is approximated to the average linear deviation from the mean luminance value. With this approximation, the threshold factor masking function can be represented by the curve of the spatial masking function. This blockiness detection algorithm works well with the appropriate masking function in the implementation of the AVQ system 110.

Apart from the spatial masking, the use of temporal masking is also incorporated. For example, when the edge detection algorithm is applied to inter-frame differences, the threshold for edge detection is scaled linearly as a function of the mean pixel value differences between consecutive frames. Other algorithms within the scope of this invention include temporal masking schemes that directly or indirectly detect the motion present in the received video.

Once the edges are filtered, the vertical edge images can be used to compute the blockiness caused by the vertical edges of the DCT blocks, and the horizontal edge image can be used in a similar fashion for the horizontal artifacts (i.e., blockiness and streakiness). At step 715, the vertical and horizontal images are further processed to include only those edge pixels that belong to an edge that is exactly vertical or horizontal and are longer than a stipulated length. For instance, a value of four for this length parameter is observed to locate the block artifact edges with reasonable accuracy. Similarly, to determine streakiness, a longer stipulated horizontal length, e.g., 15, can be used.

At step 720, the processed vertical and horizontal images are then sliced into different fields. This step is performed by down-sampling the image in the horizontal direction by a specific number. Down-sampling by eight is observed to reflect the periodicity of the artifacts accurately for typical video frames. This operation results in eight different fields of the edge image. Once down-sampled, the distribution of the edges in these different fields is observed to get an estimate of the blockiness at step 725. The distribution of down-sampled edges is illustrated in FIG. 7B. These numbers are arranged in ascending order for an easier understanding.

Images that do not have blocking artifacts would typically have edge distribution uniform across the different fields. However, a sharp deviation from uniform behavior is an indication of blockiness. As illustrated in FIG. 7B a down-sampled version of an image containing block-DCT boundaries has a disproportionate amount of long vertical edges. This deviation from expected behavior is used to calculate the blockiness estimate. Specifically, the deviation from the expected behavior in terms of the additional number of edge pixels in FIG. 7B is calculated for the subjective test database, and its relation to the subjective scores from the test database is used to design the blockiness and streakiness algorithm. In an exemplary embodiment, the measure of blockiness (i.e., compression artifacts) is determined by calculating the log (1+(constant*B)), where 'B' is the difference between the expected and actual value that, as illustrated in FIG. 7B and the constant is chosen based on maximizing the correlation of the objective scores with the existing subjective scores in the test database (the scores being determined, in a preferred exemplary embodiment, using the process described in relation to FIG. 2).

Similarly, the measure of streakiness (i.e., measure of network artifacts (M_Ne)) is determined by calculating (constant1*(Ne^constant2)−constant3*B), where 'Ne' is similar to 'B', except the skewed distribution of horizontal edges is observed, instead of the skewed distribution of vertical edges, and different parameters are used in the algorithm (i.e., longer specified lengths) and the constants are chosen based on maximizing the correlation of the objective scores with the existing subjective scores in the test database (the scores being determined, in a preferred exemplary embodiment, using the process described in relation to FIG. 2).

Therefore, FIG. 7A also describes a streakiness detector used to detect network errors. The occurrences of network artifacts (e.g., streakiness) can be evaluated as a modified blockiness measure. As with the blockiness detection, the pixel based network artifact detector also works on the spatial and temporal distribution of edges in the video. To perform a streakiness measurement, the same steps associated with a blockiness measure are performed, with the exception that the length of the horizontal edge to be detected at step 715 is stipulated by a greater threshold. This visual masking model incorporates the notion that the pixel values across the block boundaries can result in misleading values for the local variance, which can be observed by solid black lines (i.e., streaks) across the video at times. The mean and standard deviation values are calculated separately on the different sides of the block boundary to ensure that the masking value is registered correctly.

Figure 8:
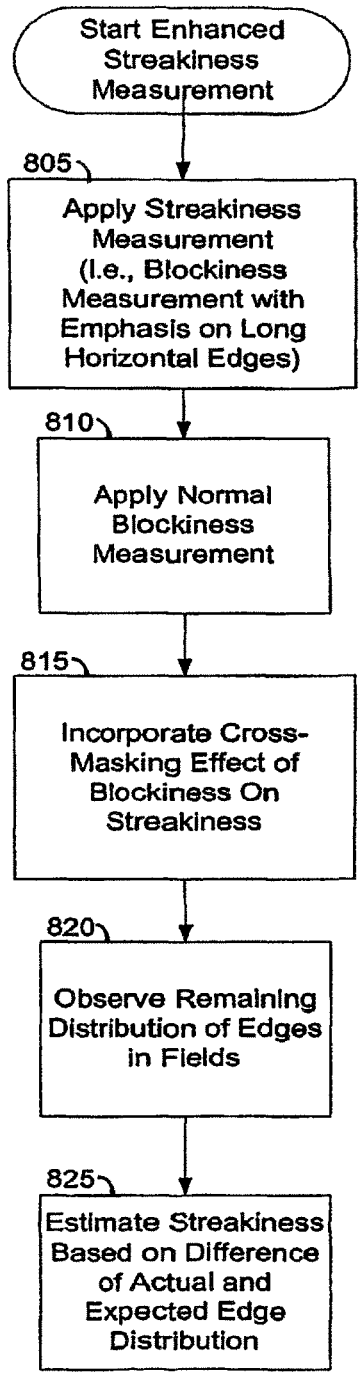
FIG. 8 illustrates a method for measuring streakiness in processed video, according to an exemplary embodiment.

Further, the streakiness network error detector can use the modified version of blockiness metric (i.e., streakiness metric) in conjunction with the blockiness metric itself, to account for the cross masking between compression and network errors. This is illustrated in FIG. 8. It is possible that videos that are extremely compressed have many blocks that could present themselves as a network streak error. To prevent the false detection of these compression artifacts as network error artifacts, a function of the fraction of compression artifacts is appropriately processed out of the network error score to incorporate cross-masking between these two types of artifact. At step 805, a streakiness measurement is performed using the modified blockiness algorithm discussed above (i.e., longer lengths stipulated in horizontal direction). Then, at step 810, a regular blockiness measure is also performed on the video image. Once these two metrics have been performed (i.e., blockiness and streakiness), the blockiness measure is subtracted from the streakiness measure at step 815 to factor out compression artifacts. With the blockiness measure subtracted out, the remaining edges in the various fields of the streakiness measure can be evaluated at step 820.

From this, an expected and actual value can be compared to estimate streakiness at step 825. As mentioned earlier, streakiness can be measured using the following equation: M_Ne=measure of network errors=(constant1*(Ne^constant2)−constant3*B), where 'Ne' is similar to 'B', except that the calculations are now performed for the horizontal direction with different parameters in the algorithm (i.e., the skewed distribution of horizontal edges is observed, instead of the skewed distribution of vertical edges) and the constants are chosen based on maximizing the correlation of the objective scores with the existing subjective scores in the test database (the scores being determined, in a preferred exemplary embodiment, using the process described in relation to FIG. 2).

Figure 9:
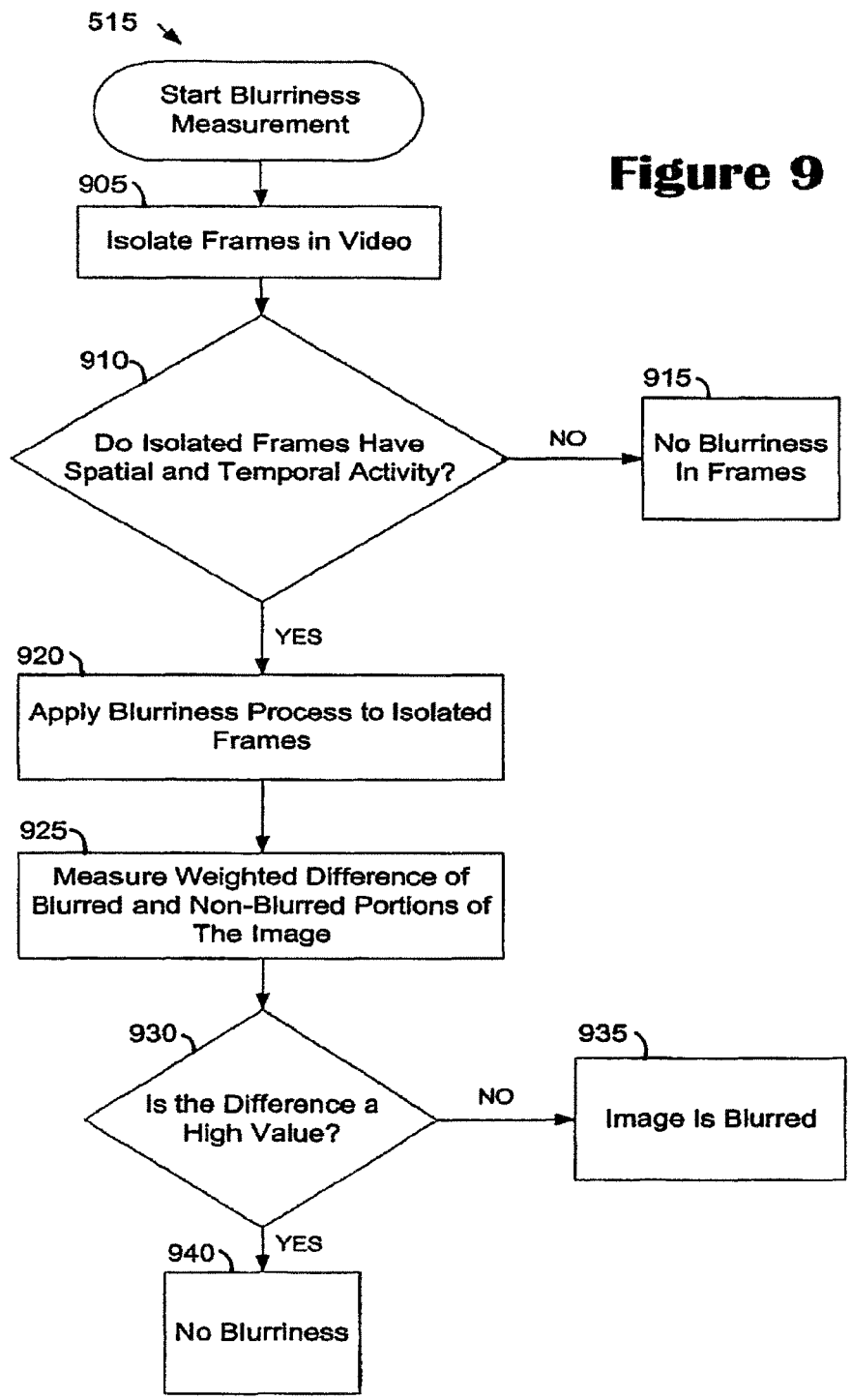
FIG. 9 illustrates a method for measuring blurriness in processed video, according to an exemplary embodiment.

Returning to FIG. 5, if no block boundaries are detected at step 510, a measure for blurriness in the video is performed at step 515. FIG. 9 illustrates a blurriness measure, according to an exemplary embodiment of the AVQ system 110. It should be noted that, in addition to processed MPEG-2 video, the blurriness metric can also be applied to JPEG 2000 type compression schemes.

The proposed blurriness metric works by observing the behavior of video when subject to spatial and temporal enhancement or degradation processes. The idea of this metric is that the smoothening process does not have as much effect on blurry images as it has on sharp images. By utilizing this metric, the problem of locating the boundaries of the edge pixels is avoided, and this simplifies the calculation of the metric.

In one exemplary embodiment, frames are isolated in processed video so that they can be analyzed at step 905. At step 910, the frames are observed to determine whether there is spatial and temporal activity. If not, then there is no blurriness in the video image at step 915.

If there is spatial and/or temporal activity, the current frame is subject to a spatial smoothing operation at step 920. This smoothing process can be done a variety of ways, but in one exemplary embodiment, each pixel is given a value of the weighted average of the surrounding 25 or 30 pixels. This has the effect of blurring the image. Once this is done, the difference between the current frame and the smoothened current frame is calculated at step 925. Specifically, the blocks/portions in these frames that have significant spatial and temporal activity are located and a weighted difference of blurred and non-blurred versions of these located portions is measured, this weight depending on the spatial and temporal activity. That is, this difference is a weighted difference measure, and incorporates spatial masking from the mean and variance of the local pixel values and measures temporal masking from inter-frame pixel differences.

At step 930, the difference is measured between the blurred and non-blurred image. The difference measured at step 930 gives more importance to regions with high spatial variance. Thus, if the difference is not high, then the image is considered to be blurry at step 935 (this is due to the fact that a blurry image cannot be blurred as much as a non-blurry image). However, if the difference is high, then the image is considered to be not blurry at step 940.

Typical blurriness metrics in literature measure spread of edges, assuming that blunt edges mean low quality. However, this is not always true. The original video could have edges in the background/distance that are intended to be blurry (i.e., blurry edges that are naturally present). To combat this problem, the consistency of edge angles in the difference between frames could be processed to enhance the blurriness measure. This stems from the notion that blurry edges that are naturally present are smooth and continuous in all frames. This can be calculated by the variation in orientation angles between successive edge pixels along the edges detected in the frame or in the difference image between successive frames. That is, naturally blurry edges can be identified by measuring the angles of the edges in the video. If the angles differ greatly from edge pixel to edge pixel (e.g., more than 30°), then the blurry edge is likely not a blurry edge that is naturally present.

After the blurriness degradation has been performed, a blurriness value is calculated at step 935 based on rules observed from the subjective measurements, as discussed with reference to FIG. 2. In an exemplary embodiment, this blurriness measure can then be calculated by taking a constant minus the difference calculated at step 930, where the constants are chosen based on maximizing the correlation of the objective scores with the existing subjective scores in the test database (the scores being determined, in a preferred exemplary embodiment, using the process described in relation to FIG. 2).

The blurriness metric has several further modifications to make it more effective. A potential problem is that smooth original images that are not blurry would produce results similar to blurry images. Therefore, to prevent this problem, the weighted difference measure between the frame and the smoothened frame in a block-by-block basis can be pooled, and only a portion of the maximum differences can be considered. Also, totally smooth video frames, such as those depicting a clear blue sky, are detected by measuring the average local variance so that the metric does not detect them as being blurry.

The blurriness detection algorithm could be used in conjunction with blockiness estimations. For instance, if block edges are not detected, then this could either mean that the video is of high quality, or is of extremely compressed low quality that the block edges are themselves smudged out. Accordingly, using the blurriness estimation algorithm in areas where the blockiness metric fails to find any block edges helps improve the detection of video artifacts. In addition to the above, the degradation process used to measure blurriness could also be used to measure other types of artifacts as well, such as, but not limited to, ringing and mosquito noise. Similarly, as with degradation to measure blurriness, enhancement processes can be used to measure sharpness (i.e., the difference between a sharpened image and original received image could be measured to determine whether the received image is sharp—where a small difference indicates sharpness in the received image). Also, the enhancement/degradation process could be utilized in specific areas (e.g., smoothening only areas containing edges, or regions that have significant spatial activity as detected by the local variance of pixels). Also, to distinguish between intended blurry edges (i.e., blurry edges that are naturally present) and edges blurred due to image/video coding, the consistency of edge angles in edges in the frame/difference-frame can be observed.

Now returning to FIG. 3, if a bit stream is available, the AVQ system 110 looks to determine whether the bit stream is useful at step 315. That is, at step 315, the bit stream is observed to see whether the headers contain information that can be used to evaluate the network. If the bit-stream is useful, then information from the header is extracted at step 335. Specifically, locations of intra/key/refresh frames are extracted from the headers of the bit stream. Then, at step 340, the location of network errors are estimated from the bit-stream. To perform this step, the packets sent over the bit stream can be subject to sanity checks to identify possible errors. The error flags generated then identify the possible locations of network errors. For example, if an I or P-frame is corrupted, then all the frames after it till the next I-frame are corrupted. However, if a B-frame is corrupted, then only the B-frame is affected. This is because a B-frame is not used as a point of reference for subsequent frames.

Figure 6:
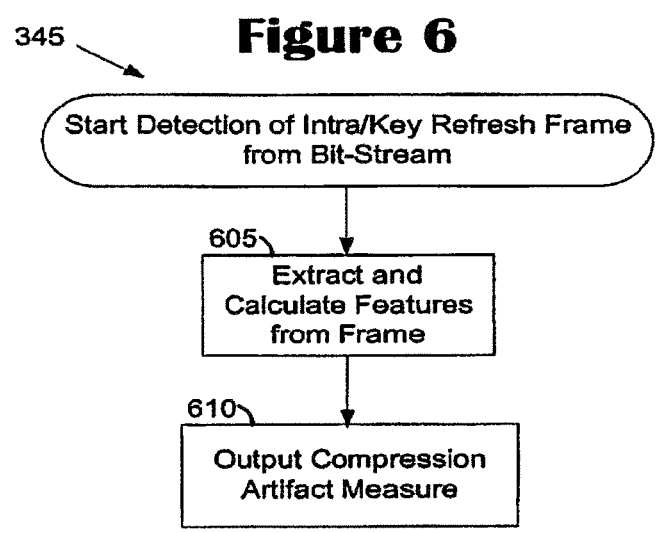
FIG. 6 illustrates a method for detecting and measuring the level of compression artifacts (CA) in the bit stream data of processed video, according to an exemplary embodiment.

After the locations of network errors are estimated, the AVQ system 110 estimates compression artifact measure from the bit stream at step 345. FIG. 6 illustrates an exemplary embodiment of estimating compression artifact measure from bit stream. At step 605, features of the frame are extracted and calculated. Specifically, from the bit-stream, values such as, but not limited to, quantization step size (Q), number of DCT coefficients used (ND), and magnitude of motion vectors can be extracted. From these values, the compression artifact measure can be calculated as compression artifact measure (CA)=log(Q) or log(ND). Alternatively, the CA can be calculated as [(constant1×log(Q))+(constant2×log(ND))+(constant1×log(Q)×log(ND))]. In general, when we are combining two modules M1 and M2, a way by which we can combine the two are [(constant1×M1)+(constant2×M2)+(constant1×M1×M2)]. Once the compression artifact measure is calculated, the value is output at step 610 to the AVQ system 110 to be used for further processing.

Returning to FIG. 3, whether the bit-stream is available and useful or not, compression artifact measure values are output to the system at either steps 330 or 345. At step 350, the AVQ system 110 calculates a signature $f$ for the current frame and a predicated frame. The predicted frame can equal the previous frame or the average of motion compensated frames in either direction. Using either of these assumptions, the mean square error or delta-autocorrelation-method can be used to determine a $f$ for the frames. In one embodiment using mean squared error, two images are subtracted and the mean squared value of the difference in the resulting image is calculated. In another embodiment, where the delta-autocorrelation method is utilized, two images are compared and autocorrelation plots of the images are generated. Then, the two autocorrelation plots are subtracted from one another. The delta-autocorrelation difference is then calculated by taking the mean absolute value of the difference in the autocorrelation plots. Alternatively, instead of an autocorrelation plot, the Absolute Mean Difference Function (AMDF) could also be used.

At step 355, the compressing artifact measure for each GOP as $f$ is estimated. Specifically, a compression artifact measure for each GOP as a function of compression artifact measure of I-frame and a specific signature of the GOP is estimated. In an exemplary embodiment, the GOP's compression artifact measure equals the I-frame's compression artifact measure times one, plus a constant times the temporal variance determined for the GOP's spatial-complexity signature. To determine the GOP's spatial-complexity signature, for each frame the average local variance of pixel values is computed. Then, the temporal variance of these numbers is computed to get the signature.

Once this estimate is completed at step 355, the network artifact measure is estimated for each frame in the network for which errors were detected at step 360 (deduced from either steps 325 or 340, depending on whether the bitstream or the pixel values were used). To make this determination, for every frame, the mean difference value between the current frame and the previous frame is computed. When access to the video bit-stream is possible, network errors can be detected by certain flags, i.e., code words with illegal run-lengths indicate network errors. Thus, a bit-stream based network error detector could work on maintaining a record of the spatial temporal behavior between frames in a neighborhood, and evaluating network artifacts as the deviance from normal behavior during packet losses. For instance, the mean difference between consecutive frames could be observed for different types of adjacent frame pairs, and this observation could be maintained on record. Accordingly, when a packet loss occurs, the frames in the region between the erroneous frame and the next refresh frame could be considered as subject to network artifacts. The artifact measure therefore would be evaluated as the deviation from the mean difference value on record for the specific frame-pair under observation.

If the current frame is a "good"/"non-corrupted" frame, then this difference value is stored as the "latest good signature value". If the current frame is detected as corrupted with packet errors, then the difference value is stored as the "current erroneous signature value". The metric score is calculated (only for erroneous frames) as the difference between the "current erroneous signature value" and the "latest good signature value". Further, the "latest good signature value" is further classified for different frame type pairs. The different frame types are 'I', 'P' and 'B'. So, the different frame pairs considered are 'I-I', 'I-P', 'P-B', 'B-I', etc. As before in step 350, the signature for the frame pairs is then calculated. For example, in one embodiment where the mean squared error is calculated, two images are subtracted and the mean squared value of the difference in the resulting image is calculated. In an embodiment where the delta-autocorrelation method is utilized, two images are compared and autocorrelation plots of the images are generated. Then, the two autocorrelation plots are subtracted from one another. The delta-autocorrelation difference is then calculated by taking the mean absolute value of the difference in the autocorrelation plots. Alternatively, instead of an autocorrelation plot, the Absolute Mean Difference Function (AMDF) could also be used.

Once a network artifact measure for each frame in the GOP has been estimated, artifact diagnostics for the GOP are estimated at step 365. As discussed in step 345, modules can be combined using simple equations. For example, M_combo=combination(M1,M2), can be determined as M_combo=[(constant1×M1)+(constant2×M2)+(constant1× M1×M2)], where these constants are decided based on maximizing the correlation of these scores with the existing subjective scores in the test database (the scores being determined, in a preferred exemplary embodiment, using the process described in relation to FIG. 2). Further, to calculate the diagnostics, the following equations can be used:

M_Q (measure of quantization)=log(Q);
M_ND (measure of network defects)=log(ND);
M_B (measure of blockiness)=log(1+(constant×B)) (where 'B' is determined based on the on the difference between the actual value and the extrapolated value, as illustrated in FIG. 7B);
M_Blr (measure of blurriness)=(constant−"difference in box 930")
M_Ne (measure of network errors)=[(constant1× (Ne$^{constant2}$)−(constant3×B)] (where 'Ne' is similar to 'B', except that it is done for the horizontal direction with different parameters);
M1=combination(M_Q, M_ND)=stream based compression artifact (CA) measure;
M2=M_B (pixel based CA measure); if M_B>a constant, else=M_Blr;
M3=combination (M1, M2)=hybrid CA measure. Upon receiving this hybrid CA measure, the compression artifact measure can be displayed on the AVQ meter 115 at step 375;
M4=M_Ne=pixel based network artifact (NA) measure. Upon computing this NA measure, the network artifact measure can be displayed on the AVQ meter 115 at step 375,
M5=combination(M3, M4).

Once the above calculations are determined, the MTBF value can be calculated as a function of the artifact scores pooled for the desired time intervals at step 370. This calculation can be computed as Log(MTBF)=[(constant1×average of M5 for the last 4 seconds (or as required))+constant2], where constant1 and constant2 can either be fixed, or linear combinations of the bit rate (if that information is received from the bit-stream). Further, constant1 and constant2 are chosen so that this MTBF correlates well with the subjective MTBF, as discussed with reference to FIG. 2. After making this computation, the AVQ system 110 display the results on the dial of the AVQ meter 115 as the MTBF.

The AVQ system 110 may also use other metrics and hybrid-metrics to observe and measure network and compression artifacts. For example, the network error detector could be based on both the pixel and bit-stream values. These two could be calculated independently and averaged or pooled in a specific fashion. Then, the network artifact measure could be measured using steps 325, 340 and 360 (as illustrated in FIG. 3). Alternatively, one algorithm could be used as a sanity check for the other. They could be mixed in different ways as well. For example, the location of packet errors could be identified from the error flags generated in the bit-stream algorithm. Then, the pixel-based algorithm could be evaluated only on the frames between the erroneous frame and the next refresh/intra/key frame.

Further, the AVQ system could also be implemented to handle stuck/reordered frames. To do so, the video quality could be measured as a function of the video quality of non-stuck/reordered frame(s) in either temporal direction and the temporal distance between the frames in comparison. The function could then be interpreted as a linear interpolation between the video qualities of the non-stuck frames in either direction based on the number of frames separating the stuck frame and the non-stuck frames. Alternatively, a detection of stuck frames could be based on pixel differences between consecutive frames or error flags generated from the bit-stream indicating dropped frames.

Although the AVQ system and associated metrics have been shown and described in a preferred form with a certain degree of particularity, it is to be understood by those skilled in the art that the present disclosure has been made only by way of example, and that numerous modifications to the method may be made without departing from the spirit and scope of the methods and systems hereinafter claimed.

We claim the following:

1. A method for measuring video artifacts in processed video, comprising:
   calculating, by a computer processor, a reference signal of the processed video according to at least one frame of the processed video, for a spatial-temporal coherence analysis;
   executing, by the computer processor, a blockiness metric based on a blockiness comparison function between the processed video and the reference signal to detect compression artifacts;
   executing, by the computer processor, a streakiness metric based on a streakiness comparison function between the processed video and the reference signal to detect network artifacts;
   executing, by the computer processor, a blurriness metric based on a blurriness comparison function between the processed video and the reference signal to detect compression artifacts; and
   generating, by the computer processor, a measurement of the video artifacts based on the execution of at least one of the metrics on the processed video,
   wherein the execution of at least one of the metrics on the processed video comprises computing a mean difference of autocorrelation plots of corresponding portions of a current received signal and the reference signal of the processed video.

2. The method of claim 1, wherein the reference signal comprises a difference or average of current and preceding frames of the processed video.

3. The method of claim 1, further comprising determining a mean time between failures (MTBF) of the processed video by combining outputs of the blockiness, streakiness, and blurriness metrics and correlating the combination with an existing subjective test database.

4. The method of claim 1, further comprising determining a Mean Opinion Score (MOS) of the processed video by combining outputs of the blockiness, streakiness, and blurriness metrics and correlating the combination with an existing subjective test database.

5. The method of claim 1, further comprising determining, by the computer, a Mean Impairment Score (MIS) of the processed video by combining the outputs of the blockiness, streakiness, and blurriness metrics and correlating the combination with an existing subjective test database.

6. The method of claim 1, further comprising displaying a level of compression artifacts in the processed video based on the execution of the blockiness metric or blurriness metric.

7. The method of claim 1, further comprising displaying a level of network artifacts in the processed video based on the execution of the streakiness metric.

8. The method of claim 1, further comprising measuring, by the computer, a temporal deviation of the processed video during a detected scene change or other video event.

9. The method of claim 1, wherein executing the streakiness or the blockiness metric on processed video comprises:
   utilizing multiple output frames of video to generate a single output frame;
   applying an edge filter to the single output frame to detect edges greater than a specified length;
   down-sampling the edges into a set of fields; and
   observing the distribution of the edges in the set of fields to detect artifacts in the processed video.

10. The method of claim 9, wherein the step of utilizing multiple output frames of video to generate the single output frame comprises the step of measuring a difference of current and preceding frames of the processed video.

11. A method for measuring video artifacts in processed video, comprising:
    executing, by a computer processor, a blockiness metric on the processed video to detect compression artifacts;
    executing, by the computer processor, a streakiness metric on the processed video to detect network artifacts;
    executing, by the computer processor, a blurriness metric on the processed video to detect compression artifacts; and
    generating, by the computer processor, a measurement of the video artifacts based on the execution of at least one of the metrics on the processed video,
    wherein the execution of at least one of the metrics on the processed video comprises computing a mean difference of autocorrelation plots of corresponding portions of a current received signal and the reference signal of the processed video, and
    wherein the step of executing the blockiness metric comprises:
    applying, by the computer processor, a vertical edge filter to a frame of video to detect vertical edges greater than a specified length;
    down-sampling, by the computer processor, the vertical edges in the frame of video into a set of fields; and
    observing, by the computer processor, a distribution of the vertical edges in the set of fields to detect compression artifacts in the processed video.

12. The method of claim 11, wherein the frame of video comprises an image representing a difference of multiple output frames of the processed video.

13. The method of claim 11, wherein the step of executing the blurriness metric comprises:
    isolating, by the computer processor, frames in the processed video;
    determining, by the computer processor, whether the isolated frames have spatial or temporal activity;
    degrading, by the computer processor, frames having spatial or temporal activity by applying a smoothing process; and
    measuring, by the computer processor, a difference between blurred and degraded frames to detect whether the processed video is blurred.

14. The method of claim 11, wherein the step of executing the streakiness metric comprises:
applying, by the computer processor, a horizontal edge filter to the frame of video to detect horizontal edges greater than a specified length;
down-sampling, by the computer processor, the horizontal edges in the frame of video into a set of fields; and
observing, by the computer processor, a distribution of the horizontal edges in the set of fields to detect network artifacts in the processed video.

15. A method for measuring video artifacts in processed video, comprising:
executing, by a computer processor, a blockiness metric on the processed video to detect compression artifacts;
executing, by the computer processor, a streakiness metric on the processed video to detect network artifacts;
executing, by the computer processor, a blurriness metric on the processed video to detect compression artifacts; and
generating, by the computer processor, a measurement of the video artifacts based on the execution of at least one of the metrics on the processed video,
wherein the execution of at least one of the metrics on the processed video comprises computing a mean difference of autocorrelation plots of corresponding portions of a current received signal and the reference signal of the processed video, and
wherein the step of executing the streakiness metric comprises:
applying, by the computer processor, a horizontal edge filter to a frame of video to detect horizontal edges greater than a specified length;
down-sampling, by the computer processor, the horizontal edges in the frame of video into a set of fields; and
observing, by the computer processor, a distribution of the horizontal edges in the set of fields to detect network artifacts in the processed video.

16. The method of claim 15, wherein the frame of video comprises an image representing a difference of multiple output frames of the processed video.

17. The method of claim 15, wherein the step of executing the blockiness metric comprises:
applying, by the computer processor, a vertical edge filter to the frame of video to detect vertical edges greater than a specified length;
down-sampling, by the computer processor, the vertical edges in the frame of video into a set of fields; and
observing, by the computer processor, a distribution of the vertical edges in the set of fields to detect compression artifacts in the processed video.

18. The method of claim 15, wherein the step of executing the blurriness metric comprises:
isolating, by the computer processor, frames in the processed video;
determining, by the computer processor, whether the isolated frames have spatial or temporal activity;
degrading, by the computer processor, frames having spatial or temporal activity by applying a smoothing process; and
measuring, by the computer processor, a difference between blurred and degraded frames to detect whether the processed video is blurred.

19. A method for measuring video artifacts in processed video, comprising:
executing, by a computer processor, a blockiness metric on the processed video to detect compression artifacts;
executing, by the computer processor, a streakiness metric on the processed video to detect network artifacts;
executing, by the computer processor, a blurriness metric on the processed video to detect compression artifacts; and
generating, by the computer processor, a measurement of the video artifacts based on the execution of at least one of the metrics on the processed video,
wherein the step of executing the streakiness metric comprises:
applying, by the computer processor, a horizontal edge filter to a first frame of video to detect horizontal edges greater than a first length;
down-sampling, by the computer processor, the horizontal edges greater than a first length into a first set of fields;
applying, by the computer processor, the horizontal edge filter to the first frame or a second frame of video to detect horizontal edges greater than a second length, where the second length is greater than the first length;
down-sampling, by the computer processor, the horizontal edges greater than the second length into a second set of fields;
calculating, by the computer processor, a difference in distribution between the second set of fields and the first set of fields; and
observing, by the computer processor, a distribution of the horizontal edges greater than the first length and the horizontal edges greater than the second length to detect network artifacts in the processed video.

20. The method of claim 19, wherein the step of executing the blockiness metric comprises:
applying, by the computer processor, a vertical edge filter to the frame of video to detect vertical edges greater than a specified length;
down-sampling, by the computer processor, the vertical edges in the frame of video into a set of fields; and
observing, by the computer processor, a distribution of the vertical edges in the set of fields to detect compression artifacts in the processed video.

21. The method of claim 19, wherein the step of executing the blurriness metric comprises:
isolating, by the computer processor, frames in the processed video;
determining, by the computer processor, whether the isolated frames have spatial or temporal activity;
degrading, by the computer processor, frames having spatial or temporal activity by applying a smoothing process; and
measuring, by the computer processor, a difference between blurred and degraded frames to detect whether the processed video is blurred.

22. The method of claim 19, further comprising measuring network error flags to assist in detecting the network artifacts.

23. The method of claim 19, further comprising detecting stuck frames on pixel differences between consecutive frames or error flags generated from a bit-stream indicating dropped frames.

24. The method of claim 19, further comprising detecting reordered frames based on inconsistencies observed in inter-frame pixel-difference based signatures or error flags generated by a bit-stream.

25. A method for measuring video artifacts in processed video, comprising:
executing, by a computer processor, a blockiness metric on the processed video to detect compression artifacts;
executing, by the computer processor, a streakiness metric on the processed video to detect network artifacts;

executing, by the computer processor, a blurriness metric on the processed video to detect compression artifacts; and generating, by the computer processor, a measurement of the video artifacts based on the execution of at least one of the metrics on the processed video, wherein the step of executing the blurriness metric comprises:

isolating, by the computer processor, frames in the processed video;

determining, by the computer processor, whether the isolated frames have spatial or temporal activity;

degrading, by the computer processor, frames having spatial or temporal activity by applying a smoothing process; and measuring, by the computer processor, a difference between blurred and degraded frames to detect whether the processed video is blurred.

26. The method of claim 25, wherein the execution of at least one of the metrics on the processed video comprises computing a mean difference of autocorrelation plots of corresponding portions of a current received signal and the reference signal of the processed video.

27. The method of claim 25, wherein the step of executing the blockiness metric comprises:

applying, by the computer processor, a vertical edge filter to a frame of video to detect vertical edges greater than a specified length;

down-sampling, by the computer processor, the vertical edges in the frame of video into a set of fields; and observing, by the computer processor, a distribution of the vertical edges in the set of fields to detect compression artifacts in the processed video.

28. The method of claim 25, wherein the step of executing the streakiness metric comprises:

applying, by the computer processor, a horizontal edge filter to a frame of video to detect horizontal edges greater than a specified length;

down-sampling, by the computer processor, the horizontal edges in the frame of video into a set of fields; and observing, by the computer processor, a distribution of the horizontal edges in the set of fields to detect network artifacts in the processed video.

29. A method for measuring video artifacts and detecting a network error in processed video, comprising:

executing, by a computer processor, a blockiness metric on the processed video to detect compression artifacts;

executing, by the computer processor, a streakiness metric on the processed video to detect network artifacts;

executing, by the computer processor, a blurriness metric on the processed video to detect compression artifacts;

generating, by the computer processor, a measurement of the video artifacts based on the execution of at least one of the metrics on the processed video;

calculating, by the computer processor, a difference between an erroneous signature value and a good signature value of an image; and calculating, by the computer processor, a signature as a mean squared difference value of current and previous frames.

30. The method of claim 29, wherein the step of executing the blockiness metric comprises:

applying, by the computer processor, a vertical edge filter to a frame of video to detect vertical edges greater than a specified length;

down-sampling, by the computer processor, the vertical edges in the frame of video into a set of fields; and observing, by the computer processor, a distribution of the vertical edges in the set of fields to detect compression artifacts in the processed video.

31. The method of claim 29, wherein the step of executing the blurriness metric comprises:

isolating, by the computer processor, frames in the processed video;

determining, by the computer processor, whether the isolated frames have spatial or temporal activity;

degrading, by the computer processor, frames having spatial or temporal activity by applying a smoothing process; and measuring, by the computer processor, a difference between blurred and degraded frames to detect whether the processed video is blurred.

32. The method of claim 29, wherein the step of executing the streakiness metric comprises:

applying, by the computer processor, a horizontal edge filter to a frame of video to detect horizontal edges greater than a specified length;

down-sampling, by the computer processor, the horizontal edges in the frame of video into a set of fields; and observing, by the computer processor, a distribution of the horizontal edges in the set of fields to detect network artifacts in the processed video.

33. A method for measuring video artifacts and detecting a network error in processed video, comprising:

executing, by a computer processor, a blockiness metric on the processed video to detect compression artifacts;

executing, by the computer processor, a streakiness metric on the processed video to detect network artifacts;

executing, by the computer processor, a blurriness metric on the processed video to detect compression artifacts;

generating, by the computer processor, a measurement of the video artifacts based on the execution of at least one of the metrics on the processed video;

plotting, by the computer processor, autocorrelation plots of two compared images;

subtracting, by the computer processor, the autocorrelation plots of the two compared images from one another; and calculating, by the computer processor, a mean absolute value of a difference in the autocorrelation plots of the two compared images.

34. The method of claim 33, wherein the step of executing the blockiness metric comprises:

applying, by the computer processor, a vertical edge filter to a frame of video to detect vertical edges greater than a specified length;

down-sampling, by the computer processor, the vertical edges in the frame of video into a set of fields; and observing, by the computer processor, a distribution of the vertical edges in the set of fields to detect compression artifacts in the processed video.

35. The method of claim 33, wherein the step of executing the blurriness metric comprises:

isolating, by the computer processor, frames in the processed video;

determining, by the computer processor, whether the isolated frames have spatial or temporal activity;

degrading, by the computer processor, frames having spatial or temporal activity by applying a smoothing process; and measuring, by the computer processor, a difference between blurred and degraded frames to detect whether the processed video is blurred.

* * * * *